United States Patent
Sutton, Jr. et al.

(10) Patent No.: US 7,496,604 B2
(45) Date of Patent: Feb. 24, 2009

(54) REDUCING DUPLICATION OF FILES ON A NETWORK

(75) Inventors: Lorin R. Sutton, Jr., Woodbridge, VA (US); Craig E. Despaux, Herndon, VA (US); Walter Scott Hall, III, Berryville, VA (US); Michael K. Adamski, Marshall, VA (US)

(73) Assignee: AOL LLC, Dulles, VA (US)

( * ) Notice: Subject to any disclaimer, the term of this patent is extended or adjusted under 35 U.S.C. 154(b) by 584 days.

(21) Appl. No.: 10/061,270

(22) Filed: Feb. 4, 2002

(65) Prior Publication Data

US 2003/0105716 A1 Jun. 5, 2003

Related U.S. Application Data

(60) Provisional application No. 60/334,578, filed on Dec. 3, 2001.

(51) Int. Cl.
*G06F 12/00* (2006.01)
*G06F 17/30* (2006.01)

(52) U.S. Cl. .................................... 707/200; 705/50
(58) Field of Classification Search .............. 705/50; 707/2, 200; 709/206
See application file for complete search history.

(56) References Cited

U.S. PATENT DOCUMENTS

| | | | | |
|---|---|---|---|---|
| 4,206,315 A * | 6/1980 | Matyas et al. | ............. | 713/180 |
| 5,202,890 A * | 4/1993 | Iketani et al. | ............. | 714/765 |
| 5,572,246 A * | 11/1996 | Ellis et al. | ............. | 725/22 |
| 5,978,791 A * | 11/1999 | Farber et al. | ............. | 707/2 |
| 6,018,774 A | 1/2000 | Mayle et al. | | |
| 6,058,428 A | 5/2000 | Wang et al. | | |
| 6,076,111 A | 6/2000 | Chiu et al. | | |
| 6,085,249 A | 7/2000 | Wang et al. | | |
| 6,097,389 A | 8/2000 | Morris et al. | | |
| 6,202,061 B1 | 3/2001 | Khosla et al. | | |
| 6,353,848 B1 | 3/2002 | Morris | | |
| 6,477,544 B1 * | 11/2002 | Bolosky et al. | ............. | 707/200 |
| 6,523,115 B1 * | 2/2003 | Ono et al. | ............. | 713/181 |
| 6,772,196 B1 | 8/2004 | Kirsch et al. | | |
| 2002/0099938 A1 * | 7/2002 | Spitz | ............. | 713/155 |
| 2002/0116508 A1 * | 8/2002 | Khan et al. | ............. | 709/229 |
| 2002/0124170 A1 * | 9/2002 | Johnson, Jr. | ............. | 713/176 |
| 2002/0184333 A1 * | 12/2002 | Appelman | ............. | 709/217 |
| 2003/0056100 A1 * | 3/2003 | Beatson | ............. | 713/176 |
| 2004/0039912 A1 * | 2/2004 | Borrowman et al. | ............. | 713/176 |
| 2004/0139327 A1 * | 7/2004 | Brown et al. | ............. | 713/176 |
| 2004/0255120 A1 * | 12/2004 | Botti et al. | ............. | 713/170 |
| 2006/0095527 A1 * | 5/2006 | Malik | ............. | 709/206 |

OTHER PUBLICATIONS

Office Action from copending U.S. Appl. No. 10/157,955, filed Feb. 15, 2005.

* cited by examiner

*Primary Examiner*—Calvin L Hewitt, II
*Assistant Examiner*—Charles C Agwumezie
(74) *Attorney, Agent, or Firm*—Fish & Richardson P.C.

(57) ABSTRACT

Systems and techniques for improving the performance of a network system having one or more sending systems and one or more receiving systems may include determining the digital signature of a received digital file, comparing the digital signature against stored digital signatures of digital files accessible to the receiving system, and determining whether to store the received digital file and/or a location identifier for the stored version of the received digital file based on a result of the comparison.

25 Claims, 4 Drawing Sheets

REDUCING DUPLICATION OF FILES ON A NETWORK

CROSS REFERENCE TO RELATED APPLICATIONS

This application claims priority to U.S. Provisional Application No. 60/334,578, filed Dec. 3, 2001, and entitled "REDUCING DUPLICATION OF FILES ON A NETWORK."

TECHNICAL FIELD

The concepts and implementations relate generally to the storage of files in network systems.

BACKGROUND

Network systems enable communication of messages among computer systems. For example, network systems enable communication of files over the Internet. Increases in computer and Internet usage have resulted in an increased number of files exchanged, causing network resources to become increasingly taxed and difficult to operate and maintain. To complicate matters, attachments may be included with files being exchanged over a network, leading to the dedication of additional network resources to the communication and storage of particular files. In fact, a popular file (e.g., electronic mail message) and its attachment may be sent numerous times from a single source or from subsequent recipients of the file and its attachment.

SUMMARY

In one general aspect, a digital signature for a received file may be determined and that signature may be compared with stored digital signatures of digital files accessible to a network system to determine whether or not to store that received file.

Implementations may include one or more of the following features. For example, the digital signature for the received file and/or a location identifier for the file may be stored with the stored digital signatures when the digital signature does not correspond to a stored digital signature. The location identifier may be generated when the comparison reveals that the digital signature of the digital file does not correspond to any of the stored digital signatures. Implementations may include storing the location identifier when the file is received a number of times corresponding to a storage threshold. Implementations also may include replacing the received file with a location identifier when the digital signature corresponds to at least one of the stored digital signatures.

Determining the digital signature may include applying a hashing technique to all or less than all of a received file. Applying the hashing technique may include applying a proprietary algorithm, the MD5 ("Message Digest 5") algorithm and/or the SHA ("Secure Host Algorithm") algorithm. Determining the digital signature also may include using one or more portions or parameters of the received file, and/or using the name and/or size of the file to determine the digital signature.

The content of the received file and the stored file may be verified, for example, by using all or part of the file name, the hash of the file, the size of the file, content in all or part of the file, or other means.

A counter may be used to monitor file usage and/or redundancy. For instance, a counter may be set to an initial value when the digital signature is added to the stored digital signatures. The counter may be incremented when the digital signature of a received file corresponds to the stored digital signature. By contrast, the counter may be decremented to effectively delete or to represent deletion of an instance of the digital file. The stored digital file, the stored digital signature, and/or the location identifier may be deleted when the counter falls below a file deletion threshold, a signature deletion threshold and a location identifier deletion threshold, respectively.

The digital file may include an electronic mail message and/or one or more attachments. The digital signature may include the digital signature of an attachment. Comparing digital signatures may include comparing digital signatures for attachments.

Determining whether to store the digital file may include determining whether the digital file has been replaced with a location identifier a number of times per stored instance that equals or exceeds a high volume threshold. When the digital file has not been replaced a number of times per stored instance greater than or equal to the high volume threshold, the location identifier for the previously-stored instance may be retrieved. When the digital file has been replaced a number of times equal to or greater than the high volume threshold, the digital file may be stored. This may include storing a location identifier for the stored digital file.

A received file may be separated into its constituent components using an apparatus with one or more electronic mailboxes. The electronic mailboxes may include one or more location identifiers useful in identifying content portions of electronic mail messages and/or attachments to those messages.

These and other aspects may be implemented by an apparatus and/or by a computer program stored on a computer readable medium such as a disc, a client device, a host device and/or a propagated signal. The apparatus that determines digital signatures may include a device physically distinct from other devices that receive the digital file. The apparatus may also forward digital signatures and/or have a local data store of signatures.

As such, details of one or more implementations are set forth in the accompanying drawings and the description below. Other features will be apparent from the description and drawings, and from the claims.

DESCRIPTION OF DRAWINGS

Like reference symbols in the various drawings may indicate like elements.

DETAILED DESCRIPTION

Figure 1:
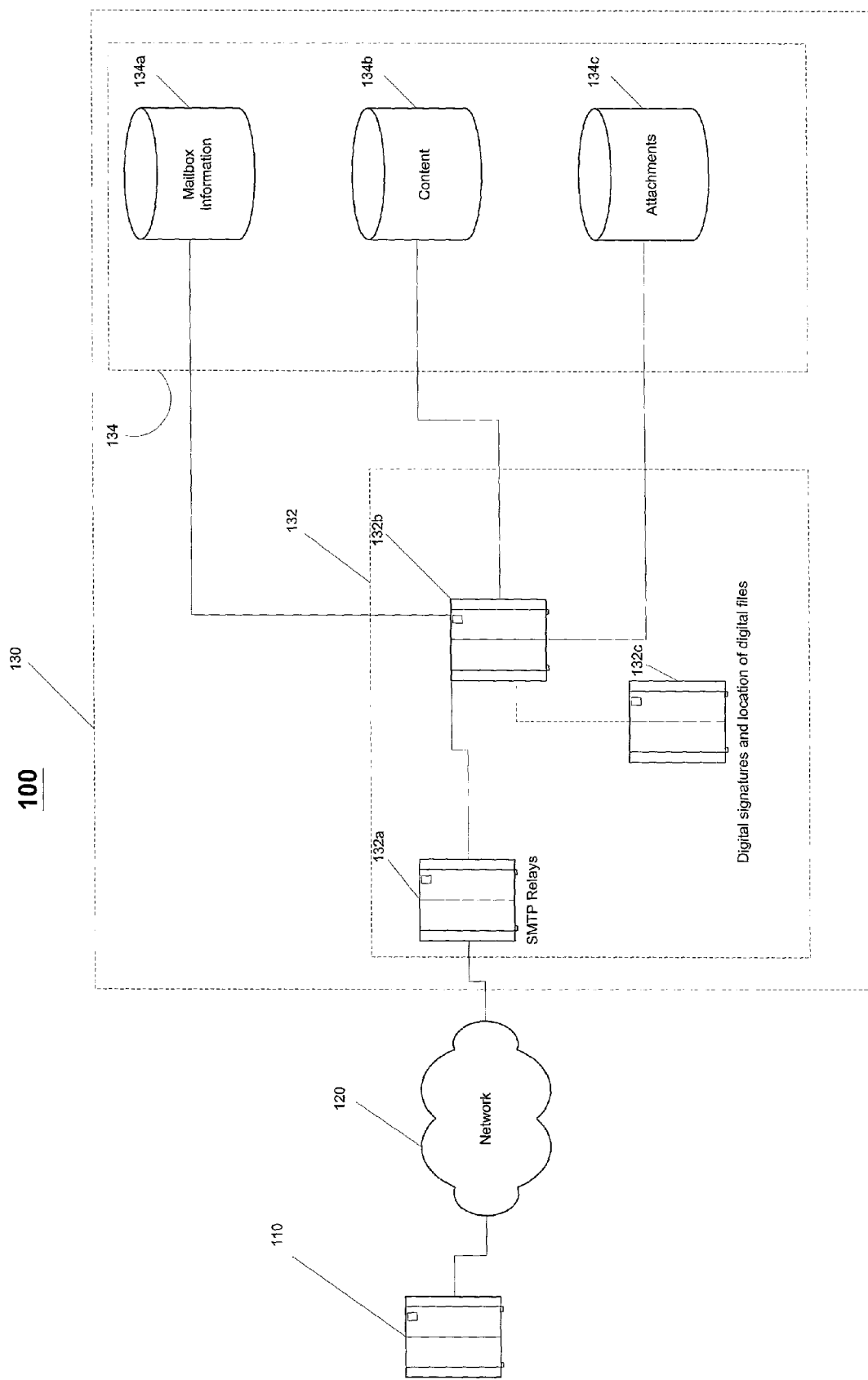
FIG. 1 is a block diagram illustrating an exemplary network system capable of reducing duplication of files on a network.

For illustrative purposes FIGS. 1-4 illustrate a network system and techniques implemented by that system for receiving electronic files and reducing their duplication. Referring to FIG. 1, a network system 100 is structured and arranged to enable the exchange of files between a sending system 110 and a receiving system 130 through a network 120. For brevity, several elements in these figures are represented as monolithic entities. However, as would be understood by one skilled in the art, implementations of these elements may include numerous interconnected computers and components that are designed to perform a set of specified operations and/or that are dedicated to a particular geographical region. Furthermore, one or more of the elements illustrated by FIG. 1 may be operated jointly or independently by one or more organizations.

Each of the sending system 110 and the receiving system 130 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The sending system 110 may be structured and arranged to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the sending system 110 or the receiving system 130.

The sending system 110 may include a communication interface (not shown), such as, for example, an electronic mail gateway. For instance, the sending system 110 may include a dedicated mailing system that is implemented by specialized hardware or executed by a general purpose processor capable of running various applications, such as electronic mailer programs, and capable of employing various file transfer protocols, such as the SMTP ("Simple Mail Transfer Protocol"). The communications interface of sending system 110 enables communications between the sending system 110 and other systems through, for example, network 120.

The network 120 typically is structured and arranged to enable direct or indirect communications between the sending system 110 and the receiving system 130. Examples of the network 120 include the Internet, the World Wide Web, WANs (Wide Area Networks), LANs (Local Area Networks), analog or digital wired and wireless telephone networks (e.g. PSTN ("Public Switched Telephone Network"), ISDN ("Integrated Services Digital Network"), or xDSL ("Digital Subscriber Loop")), radio, television, cable, satellite, and/or any other delivery mechanism for carrying data. The network 120 may include a direct link between the sending system 110 and the receiving system 130, or the network 120 may include one or more networks or subnetworks between them. Each network or subnetwork may include, for example, a wired or wireless data pathway capable of carrying and receiving data.

The receiving system 130 may be structured and arranged to form part of or include an information delivery system, such as, for example, electronic mail, the World Wide Web, an online service provider, and/or other analog or digital wired and/or wireless systems that enable communication or delivery of information.

As shown in FIG. 1, in one exemplary implementation, the receiving system 130 may include an intermediate system 132 and a user accessible system 134.

The intermediate system 132 may be structured and arranged to receive files from one or more sending systems 110 and to distribute received files to the user accessible system 134. These files may include, for example, electronic mail, attachments to electronic mail, or other files, as described below. The intermediate system 132 may include one or more SMTP relays 132a, file segmentors 132b, and/or data stores 132c.

The SMTP relays 132a may be structured and arranged to initially receive incoming files (e.g., electronic mail). They generally are configured to capture received SMTP traffic from a sending system 110 to avoid refusal of connections requested by a sending system 110. The SMTP relay 132a may include one or more general purpose computing devices running SMTP-receiving applications or they may be implemented to varying degrees in specialized hardware implementations that are designed to receive files. The SMTP relays 132a also may be implemented using one or more applications residing on a device consolidating one or more file receiving functions. In the implementation shown by FIG. 1, the SMTP relays 132a are structured and arranged to communicate with one or more file segmentors 132b.

The file segmentors 132b may be structured and arranged to segment a digital file into its constituent parts including, for example, header information, content and attachments.

Figure 2:
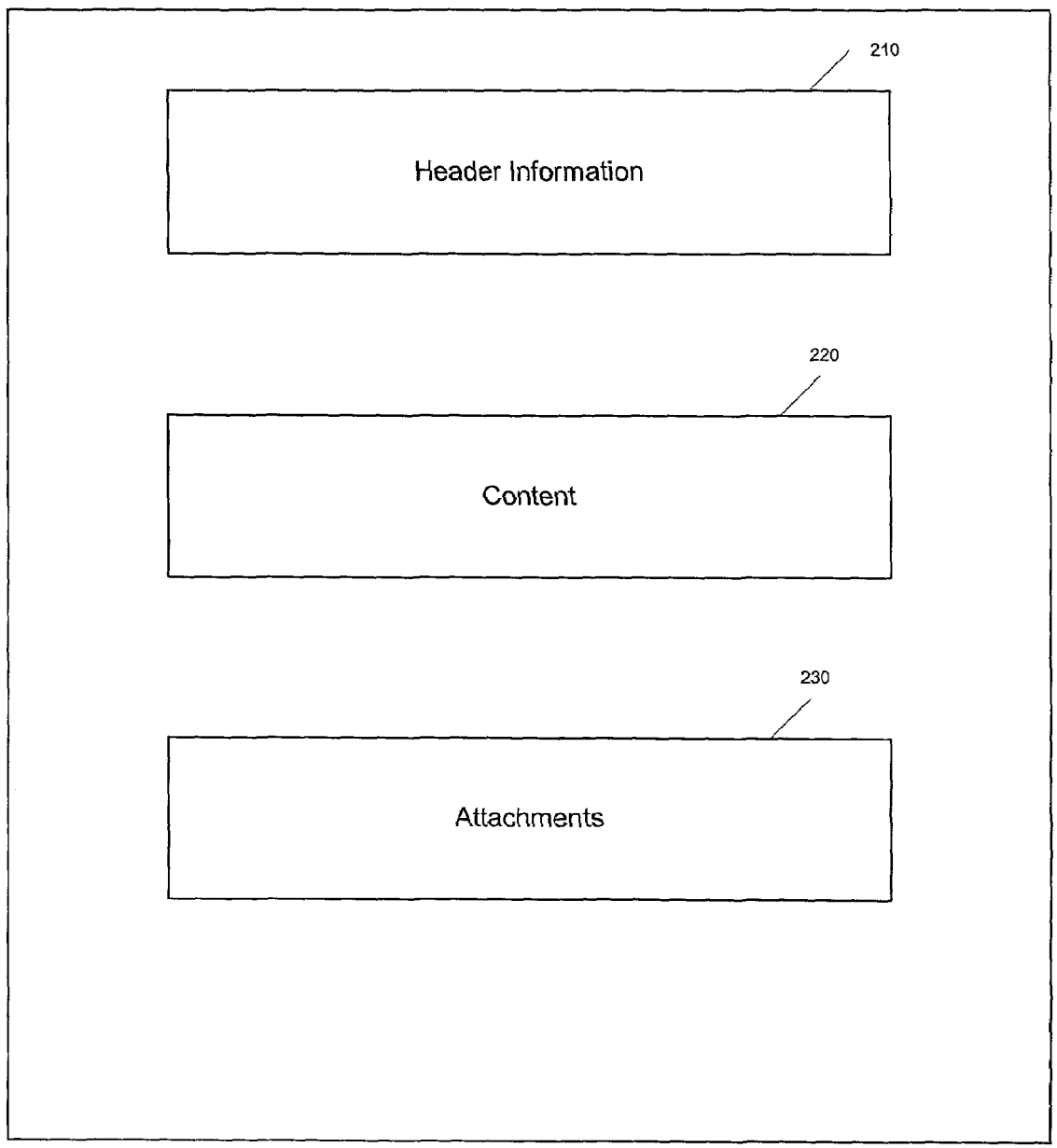
FIG. 2 is a block diagram illustrating an exemplary digital file which may be included in, constitute, or contain a file exchanged in a network system, such as that illustrated by FIG. 1.

FIG. 2 illustrates a digital file 200 that includes header information 210, content 220, and attachments 230, although the digital file 200 may include only one of these components or some combination or subset of these components. The digital file 200 of FIG. 2 may represent an electronic mail message received from the sending system 110, where the sending system is configured to transmit electronic mail messages. In some implementations, the header information 210 may include identification information for the sender and/or the intended recipient. The content 220 may include a message having, for example, text formatted in plain text or other of various formats including RTF ("Rich Text Format") or other public and proprietary formatting techniques. The attachments 230 may include electronic documentation, holiday greetings, or other files formatted as text, images, video, audio, or otherwise.

The file segmentor 132b may be structured and arranged to separate portions of the digital file received by receiver 130 (e.g., through SMTP relays 132a) into constituent parts and to associate those constituent parts with an identifier and/or an electronic mailbox associated with an identifier related to the digital files. The identifier may include a screen name, a user identification, an IP address or other information. In some implementations, the identifier may include authentication information, information associated with the online identification including mailbox parameters such as mailbox size, address book information, or status of mail sent or received. The identifier also may include other information, such as location identifiers (e.g. pointers, arrays, records) that identify other parts of the digital file. The identifier may be used to enable access to the information, content, and attachments associated with a particular identity, e.g., a sender. For instance, a user may access pointers for various digital files (e.g., electronic mail messages) based on a personal identifier, which may be known by the user or transparent to the user.

The file segmentor 132b may separate particular or predesignated content of a received digital file from other sections of that digital file. As described with respect to FIG. 2, the content may be in any of various forms, such as a text message, a letter, or other information. For example, the content portion may include a letter instructing the recipient to "please see attached."

The file segmentor 132b may separate one or more attachments from the digital file received. In some implementations, this may include removing electronic documentation from an electronic mail message. For instance, an attachment with holiday greetings may be separated from a received electronic mail message and dynamically linked to that electronic mail message by a pointer.

The data store 132c may be structured and arranged to enable searches of the digital files or portions of digital files separated by file segmentor 132b against other stored digital files stored by or capable of communicating with, and thus accessible to, the receiving system 130.

The data store 132c may be implemented by one or more general purpose computers running an operating system and an application. For example, the data store 132c may be implemented as a group of servers running a general purpose operating system and several applications that search accessed or maintained digital signatures that correspond to stored digital files accessible to the receiving system. Implementations may include having the data store 132c operate on a special purpose device running a reduced operating system. For example, the data store 132c may include hardware designed to support large arrays of signatures and to return results of a search of those signatures.

In some implementations, the data store 132c may be structured and arranged to be able to determine a digital signature for a digital file or some portion of an electronic mail message separated by file separator 132b. However, in other implementations, this functionality may be implemented through a separate program or process residing on a separate server that includes or communicates with the file segmenter 132b.

The data store 132c may include processing capabilities that enable a comparison of the digital signature with stored digital signatures of digital files accessible to the receiving system. The data store 132c may reside as a separate process or program running on a general-purpose device. Alternatively, the data store 132c may be a specialized hardware device. Other implementations may feature this capability to compare the digital signature with the digital signatures of stored digital files residing on a shared device that performs limited functions. The device may have regional awareness of some stored digital signatures for files received by one or several devices. Other implementations may feature a data store 132c with global awareness of all stored digital signatures. Some implementations of the data store 132c may offer global awareness of stored digital signatures residing in several systems, and also may be structured and arranged to implement a local awareness in individual systems in the event of an outage.

The digital signatures of stored digital files accessible to the receiving system 130 may be stored as an array of values, an index, a dynamic list or other information stored locally at data store 132c, remotely in a single device, or distributed across several devices. The digital signatures may be sorted or organized for faster comparisons. The user-accessible system 134 generally is structured and arranged to enable access to files that have been sent to the receiving system 130 or that are otherwise accessible to that system. In the implementation shown in FIG. 1, the user accessible system 134 generally includes devices that store a digital file in its constituent parts. For instance, the user accessible system 134 may include a storage device 134a for electronic mailbox information (e.g., header information), a storage device 134b for content information, and a storage device 134c for attachments.

In this manner, the receiving system 130 may be structured and arranged to reduce duplication of electronic files received. For example, if the intermediate system 132 determines that there are numerous instances of a file through a comparison of digital signature or otherwise, a location identifier (e.g., a pointer, address, reference, or link) may be stored for one or more of the instances of the file rather than maintaining each copy of the file. For instance, an OSP ("online storage provider") may eliminate or replace duplicate attachments to received email by storing a pointer to other instances of the same attachment. More generally, subsequently-received digital files having the same attachment may be stored with a location identifier that points to an instance of the attachment previously received and/or stored, rather than repeatedly storing the same attachment.

Figure 3:
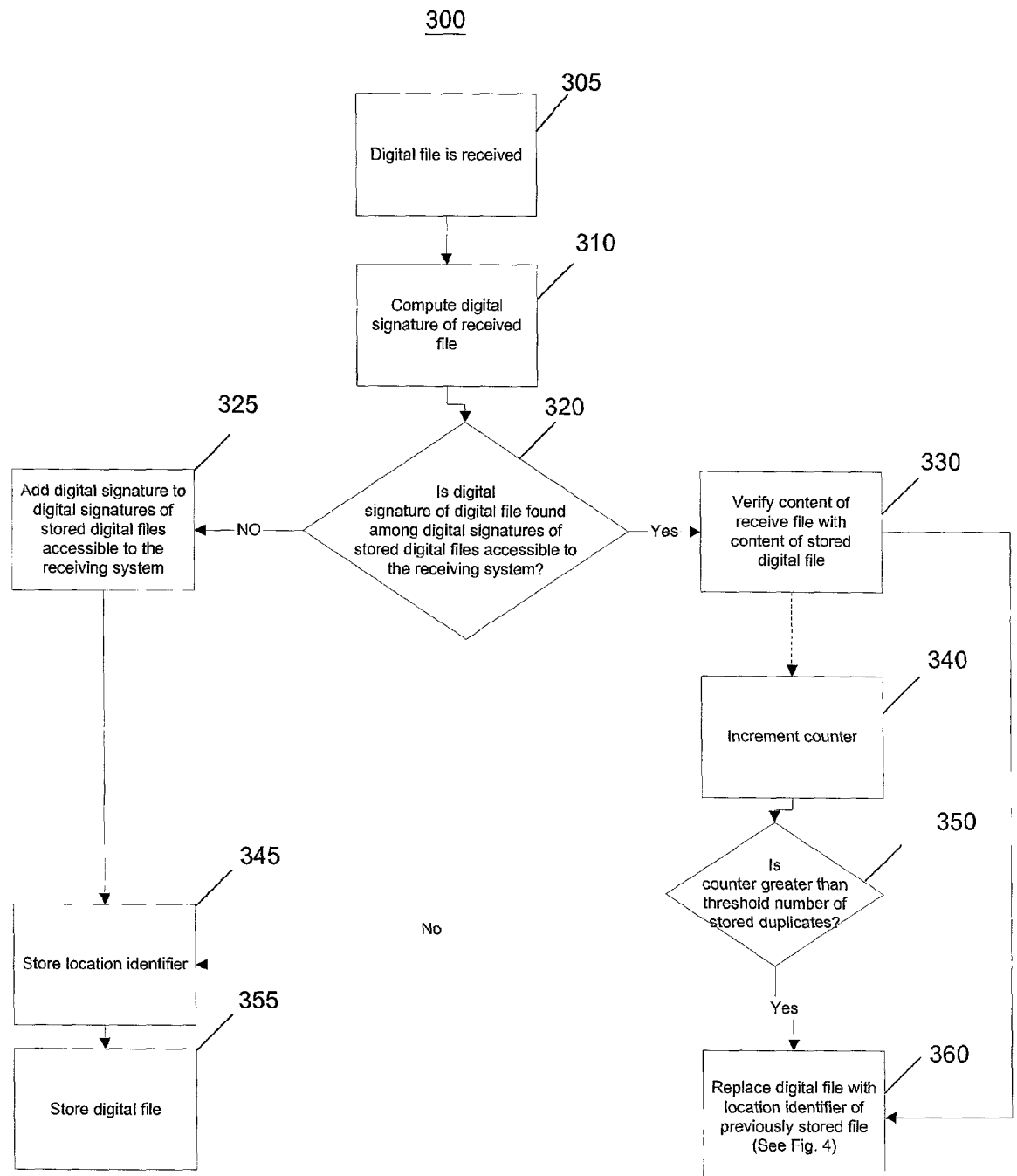
FIG. 3 is a flow chart illustrating an exemplary process for receiving a file using a network system, such as that illustrated by FIG. 1.

FIG. 3 illustrates one implementation of a process for reducing duplication of digital files. For convenience, the process shown in FIG. 3 references particular componentry described with respect to FIG. 1. However, similar methodologies may be applied in other implementations where different componentry is used to define the structure of the system, or where the functionality is distributed differently among the components shown by FIG. 1.

Initially, a digital file is received by, for example, receiving system 130 from sending system 110 (step 305). In one implementation, the digital file received includes an electronic mail message and/or an attachment to that message.

A digital signature may be computed for the received file using various techniques (step 310). Generally, a digital signature is a unique "profile" or "finger print" of a digital file that identifies the digital file. The digital signature for a file may be computed, for example, by applying a hashing technique to all or less than all of the file. The output of the hashing technique is referred to as a hash value. Typically, the hash value is substantially smaller than the requested digital file, and is generated from an algorithm in such a way that it is extremely unlikely that different data files will produce the same hash value. Examples of hashing techniques include, but are not limited to, the MD5 ("Message Digest 5") family of algorithms and/or the SHA ("Secure Hash Algorithm") family of algorithms.

The digital signature for a data file may be computed at the receiving system, for example, at data store 132c of receiving system 130, or it may be computed at the sending system before a data file is communicated. In the later implementation, the digital signature optionally may be encrypted. For instance, in one implementation, the sending system 110 determines a digital signature for a digital file to be transmitted by applying a hashing technique to that digital file. Then, the digital file and the obtained hash value are encrypted and sent to the receiving system 130. Upon receiving the encrypted data from the sending system 110, the receiving system 130 decrypts the data file and the hash value using an appropriate key. To verify the integrity of the data file, the receiving system 130 may perform the same hashing technique applied by the sending system 110 and may compare the resulting hash value to the decrypted hash value. If the hash values are the same, the integrity of the data is presumed to have been preserved across the network 120, and the hash value is used as a digital signature for the file.

Whether the digital signature is computed by the recipient and/or sender, the generation of the digital signature may be based on various information related to the digital file. For example, a name could be used in conjunction with the file size and a hash value. Other implementations may use a portion of those or different parameters.

In another example, a received file may be separated into one or more constituent parts such that the digital signature is determined based on one or more of the constituent parts. For instance, a digital file may be separated into header information 210, content 220, and attachments 230. The digital signature may be computed for one or more of the component parts, e.g., the attachments 230.

Once the digital signature is computed for a digital file (step 310), the digital signature is compared with other digital signatures, for example, digital signatures of stored digital files accessible to the receiving system 130 (step 320). In some implementations, comparing the digital signature with the stored digital signatures involves a comparison of digital signatures for less than all aspects of a digital file. For example, the receiving system 130 may only attempt to check for duplicate attachments that are received as part of a digital file. In other implementations, the digital signatures for entire files may be compared.

If the computed digital signature is not among the stored digital signatures (step 320), the digital signature may be added to the stored digital signatures (step 325), along with a location identifier (step 345) for the received digital file which is itself stored (step 355).

A counter may be used to indicate whether to delete instances of the digital file when the counter drops to or below a file deletion threshold. For example, if several users have deleted their user copy of the deleted file (e.g., by deleting mail files in a mailbox), the counter may be decremented. In one implementation, when the counter reaches a signature deletion threshold, the digital signature may be removed from the stored digital signatures. In another implementation, when the counter drops below a location identifier deletion threshold, the location identifier may no longer be replaced for digital files. For example, the location identifier may be removed from the stored digital signatures.

Typically, if the digital signature is found among the stored digital signatures (step 320), the received digital file is replaced with a location identifier or pointer to the stored instance of the file to avoid duplication while enabling future access to the received digital file. For example, as described with respect to steps 330-360, if a digital signature corresponding to a digital signature for a received email attachment is found in the stored digital signatures, a location identifier corresponding to the stored digital signature may be accessed and stored as a pointer to a previously-stored instance of the email attachment rather than storing the received attachment redundantly.

More specifically, if the digital signature is found among the stored digital signatures accessible to the receiving system, the receiving system 130 verifies that the received digital file corresponds to the stored file to ensure that the files are the same prior to replacing the digital file with a location identifier (step 330). Examples of verifying content include, but are not limited to, examining and/or comparing attributes of the content such as its name or size, and/or data associated with the retrieved file.

In one implementation, once the content is verified (step 330), the received digital file is replaced with a location identifier that points to or otherwise identifies the previously-stored instance of the duplicative received digital file, thereby avoiding redundant storage of the same file.

In more sophisticated implementations, a counter may be used to indicate the number of times a digital file has been received and to limit replacement of duplicative digital files based on this number (see steps 340-350). Specifically, when a digital signature is added to the stored digital signatures, a counter associated with the digital signature may be set to an initial value. Each time the digital signature is found in the stored digital signatures, the counter is incremented (step 340). Generally, the receiving system 130 replaces the digital file with a location identifier after the signature is found in received files a storage threshold number of times (steps 350-360). In addition, the location identifier generally is stored when the counter is below the storage threshold (steps 350 and 345). For example, when the counter reaches the storage threshold (step 350), the digital file may be replaced with a location identifier to avoid duplication (step 360). However, before the storage threshold is reached (step 350), the location identifier may be stored (step 345) along with the digital file (step 355). That is, as will be described with respect to FIG. 4, to distribute load and/or provide some measure of redundancy, a receiving system 130 may continue to store a digital file after the digital signature is found in the stored digital signatures accessible to the receiving system (step 355).

Figure 4:
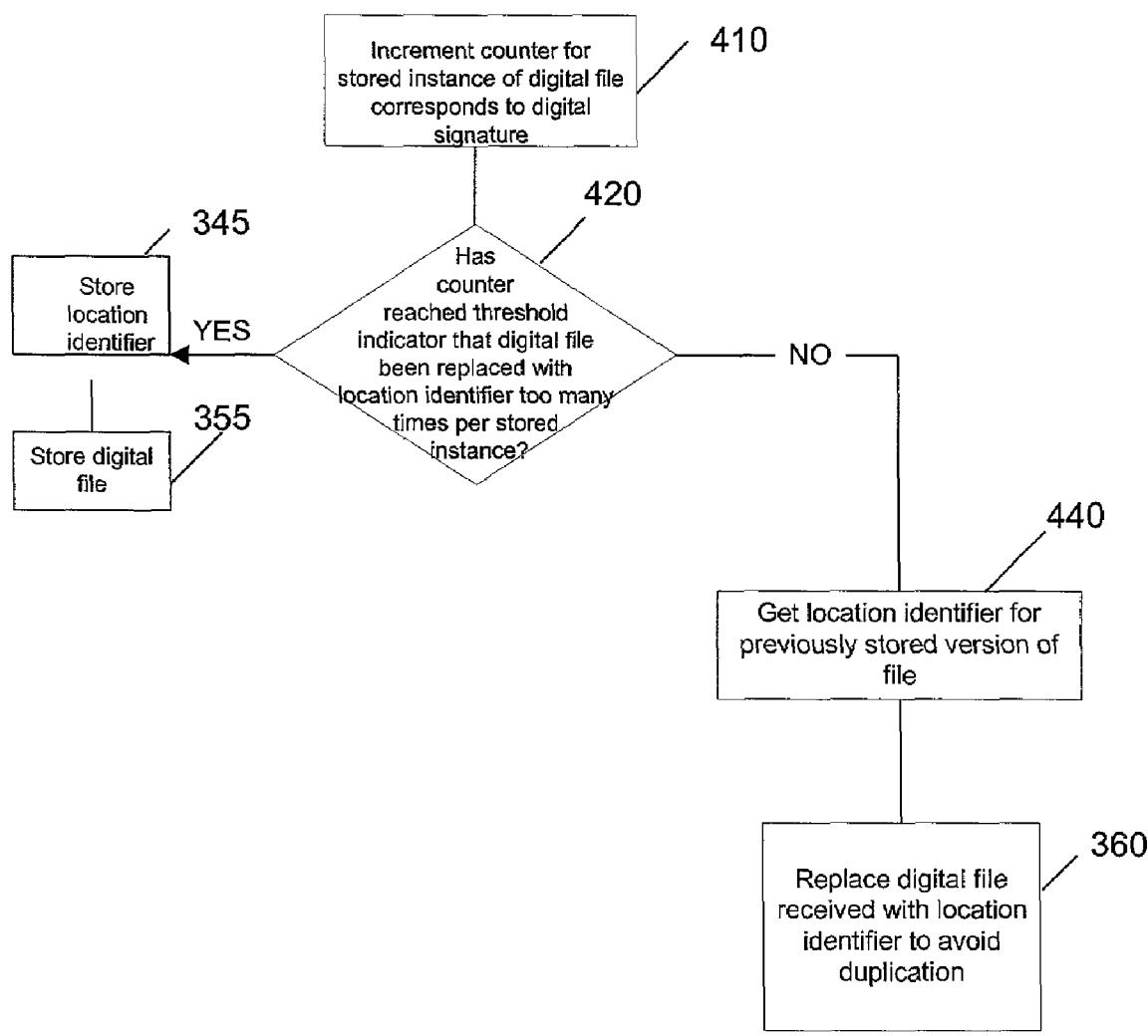
FIG. 4 is a flow chart illustrating an exemplary process for receiving and processing a file using a network system such as that illustrated by FIG. 1, when the digital file has been received beyond a storage threshold number of times.

FIG. 4 shows a procedure 400 that may be used to reduce duplication of files and that includes storing more than one copy of a file. In some cases, it is advantageous to store more than one copy of a file on the receiving system 130. For example, several copies may be stored according to a predetermined ratio to implement load balancing. At high frequencies, the receiving system 130 may store additional instances of the file to handle the volume of requests even after the receiving system 130 has begun to replace the digital file with a location identifier. When the frequency diminishes, instances of the file may be removed.

Procedure 400 generally is used after a receiving system 130 has determined that the digital signature of a received digital file is among the stored digital signatures (step 320). As such, procedure 400 may be implemented in lieu of or in addition to steps 330, 340 and 350 to determine whether to store another instance of the received digital file or replace the received digital file with a location identifier for a previously-stored instance of that file.

Initially, as part of determining that the digital signature for the received file is found in the stored digital signatures, the counter is incremented (step 410).

The counter is checked to see if the digital file has been replaced a high volume threshold number of times with a location identifier per stored instance (step 410). If this is the case, the receiving system 130 then stores the location identifier (step 345) along with the newly stored instance of the digital file (step 355). Thus, subsequently finding the digital signature in the stored digital signatures distributes access to the digital file across more copies. If not, the receiving system 130 returns a location identifier for the previously-stored version of the digital file (step 440). The receiving system 130 replaces the digital file with the location identifier to avoid duplication (step 360).

Some implementations may manage high demand conditions by storing multiple instances of the stored digital signatures, and/or including multiple receiving systems 130. In high demand conditions, the multiple stored files, multiple stored digital signatures, and/or multiple receiving systems 130 are accessible to users (e.g., through a round robin assignment). For example, when multiple instances of a file are stored, the receiving system 130 may alternate assignment of location identifiers among the stored instances.

Other implementations may initially add a digital signature to the stored digital signatures but will only replace the digital file with a location identifier based on frequency, such as, when the digital signature is found in the stored digital signatures more than a high volume threshold number of times during a given period of time. For example, the counter that keeps track of the number of times a digital file is received could be reset to an initial value every time the high volume threshold is reached, which then resets the counter as another instance of the file is stored. In another example, the receiving system 130 may replace a file with a location identifier when the file has been received or requested at least five hundred times in a one-hour period.

In some implementations, each digital file, the constituent parts of a digital file or digital signatures associated with a digital file may include an associated time stamp. For example, when a digital signature is added to the stored digital signatures, a time stamp may indicate when the digital signature was added. The time stamp may be used to keep the stored digital signatures current, and subsequent matches to the digital signature may update the time stamp. The time stamp also may be used to remove digital signatures corresponding to files that are not frequently and/or recently requested.

The methods, devices and programs of the receiving system may be implemented in hardware or software, or a combination of both. In some implementations, the methods, devices and programs are implemented in computer programs executing on programmable computers each with at least one processor, a data storage system (including volatile and non-volatile memory and/or storage elements), at least one input device, and at least one output device. Program code is applied to input data to perform the functions described herein and generate output information. The output information is applied to one or more output devices.

The methods, devices and programs of the receiving system may be implemented as a computer program storable on a medium that can be read by a computer system, such as receiving system 130, configured to provide the functions described herein. While the methods, devices and programs are described as if executed on a separate processor, the methods, devices and programs may be implemented as a software process executed by one or more receiving systems 130.

Each program may be implemented in a high level procedural or object oriented programming language to communicate with a computer system. However, the programs can be implemented in assembly or machine language, if desired. In any case, the language may be a compiled or interpreted language.

Each such computer program may be stored on a storage media or device (e.g., ROM ("Read Only Memory") or magnetic diskette) readable by a general or special purpose programmable computer, for configuring and operating the computer when the storage media or device is read by the computer to perform the procedures described herein. The computer readable medium can also be a propagated signal. The receiving system 130 system may also be considered to be implemented as a computer-readable storage medium, configured with a computer program, where the storage medium so configured causes a computer to operate in a specific and predefined manner to perform the functions described herein.

A number of implementations have been described. Nevertheless, it will be understood that various modifications may be made. For example, although the methods, devices and programs have been described in the context of a wide area public network, the methods, devices and programs can be applied to any network (including private wide area and local area networks) in which files transmitted from one node are transmitted to a receiving processor that can be programmed or configured as a receiving system.

Other implementations are within the scope of the following claims.

What is claimed is:

1. A method for reducing duplication of files in an electronic messaging system, the method comprising:

receiving an electronic message addressed to a user, the electronic message including a header portion, a content portion, and a digital file;

storing a representation of the electronic message with at least the header portion in association with the user's mailbox;

determining a digital signature for the digital file included in the electronic message;

accessing, from electronic storage, multiple digital signatures, each of the multiple digital signatures corresponding to a digital file included in a previous electronic message received by the electronic messaging system prior to receiving the electronic message;

comparing the digital signature for the digital file included in the electronic message against the accessed multiple digital signatures;

based on comparison results, determining whether the digital signature for the digital file included in the electronic message relates to a digital signature included in the accessed multiple digital signatures; and conditioned on determining that the digital signature for the digital file included in the electronic message relates to a digital signature included in the accessed multiple digital signatures:

identifying the related digital signature, the related digital signature corresponding to the digital file;

accessing volume data associated with the related digital signature, the volume data being based on a number of times that the digital file has been included in electronic messages received by the electronic messaging system;

determining, based on the accessed volume data, whether the digital file has been included in electronic messages received by the electronic messaging system more than a threshold number of times;

conditioned on determining that the digital file has been included in electronic messages received by the electronic messaging system more than the threshold number of times:

accessing a location identifier associated with the related digital signature, the location identifier identifying a location of the shared digital file corresponding to the related digital signature, and configuring, based on the accessed location identifier, the representation of the electronic message to reference the shared digital file corresponding to the digital file; and conditioned on determining that the digital file has not been included in electronic messages received by the electronic messaging system more than the threshold number of times:

storing a user version of the digital file in electronic storage associated with the electronic messaging system, and configuring the representation of the electronic message to access the user version of the digital file.

2. The method of claim 1 wherein the digital file comprises an electronic mail message.

3. The method of claim 2 wherein the digital file includes an attachment in an electronic mail message.

4. The method of claim 3 wherein determining the digital signature for the digital file includes determining the digital signature of the attachment.

5. The method of claim 1 wherein each of the accessed multiple digital signatures correspond to an attachment of an electronic mail message accessible by the electronic messaging system.

6. The method of claim 1 further comprising storing a location identifier for a previously-stored digital file corresponding to the related digital signature.

7. The method of claim 6 further comprising not redundantly storing the digital file included in the electronic message.

8. The method of claim 1 wherein determining the digital signature includes applying a hashing technique to all or part of all of the digital file.

9. The method of claim 8 wherein applying the hashing technique includes applying an MD5 algorithm to the digital file.

10. The method of claim 8 wherein applying the hashing technique includes applying a version of an SHA algorithm to the digital file.

11. The method of claim 1 wherein the digital signature is determined from less than all of the digital file.

12. The method of claim 1 wherein the digital signature is determined based on a name of the digital file.

13. The method of claim 1 wherein determining the digital signature is determined based on a size of the digital file.

14. The method of claim 1 further comprising verifying that the digital file included in the electronic message corresponds to the shared digital file corresponding to the related digital signature.

15. The method of claim 14 wherein verifying that the digital file included in the electronic message corresponds to the shared digital file corresponding to the related digital signature includes verifying that at least a portion of a name of the digital file included in the electronic message corresponds to at least a portion of a name of the shared digital file.

16. The method of claim 14 wherein verifying that the digital file included in the electronic message corresponds to the shared digital file corresponding to the related digital signature includes verifying based on a size of the digital file.

17. The method of claim 14 wherein verifying that the digital file included in the electronic message corresponds to the shared digital file corresponding to the related digital signature includes verifying based on a hash performed on the digital file.

18. The method of claim 14 wherein verifying that the digital file included in the electronic message corresponds to the shared digital file corresponding to the related digital signature includes verifying based on data in the digital file.

19. The method of claim 1 wherein determining, based on the accessed volume data, whether the digital file has been included in electronic messages received by the electronic messaging system more than the threshold number of times includes determining, based on the accessed volume data, whether the digital file has been included in electronic messages received by the electronic messaging system more than the threshold number of times, the threshold number of times being greater than two.

20. The method of claim 1 wherein:
accessing volume data associated with the related digital signature, the volume data being based on a number of times that the digital file has been included in electronic messages received by the electronic messaging system includes accessing a counter associated with the related digital signature, the counter being configured to count the number of times that the digital file has been included in electronic messages received by the electronic messaging system; and
determining, based on the accessed volume data, whether the digital file has been included in electronic messages received by the electronic messaging system more than the threshold number of times includes determining whether a value of the counter associated with the related digital signature is greater than the threshold number of times.

21. A method for reducing duplication of files in an electronic messaging system, the method comprising:
receiving a first electronic message addressed to a first user, the first electronic message including an digital file;
storing a representation of the first electronic message;
determining a first digital signature for the digital file included in the first electronic message;
accessing, from electronic storage, a second digital signature corresponding to a digital file included in a previous electronic message received by the electronic messaging system prior to receiving the first electronic message;
comparing the first digital signature for the digital file included in the first electronic message against the second digital signature;
based on comparison results, determining that first digital signature for the digital file included in the first electronic message relates to the second digital signature, the second digital signature being associated with a first shared instance of the digital file;
accessing volume data associated with the second digital signature, the volume data being based on a number of times that the digital file has been included in electronic messages received by the electronic messaging system;
determining, based on the accessed volume data, that the digital file has been included in electronic messages received by the electronic messaging system more than a first threshold number of times;
in response to determining that the digital file has been included in electronic messages received by the electronic messaging system more than the first threshold number of times:
  accessing a first location identifier associated with the second digital signature, the first location identifier identifying a location of the first shared instance of the digital file, and
  configuring, based on the accessed first location identifier, the representation of the first electronic message to reference the first shared instance of the digital file;
updating the volume data associated with the second digital signature based on receiving the first electronic message including the digital file;
receiving a second electronic message addressed to a second user, the second electronic message being different from the first electronic message and including the digital file;
storing a representation of the second electronic message;
determining a third digital signature for the digital file included in the second electronic message;
accessing, from electronic storage, the second digital signature;
comparing the third digital signature for the digital file included in the second electronic message against the second digital signature;
based on comparison results, determining that the third digital signature for the digital file included in the second electronic message relates to the second digital signature, the second digital signature being associated with the first shared instance of the digital file;
accessing the updated volume data associated with the second digital signature;
determining, based on the updated volume data, that the digital file has been included in electronic messages received by the electronic messaging system more than a second threshold number of times, the second threshold number of times being greater than the first threshold number of times;

in response to determining that the digital file has been included in electronic messages received by the electronic messaging system more than the second threshold number of times:
  storing a second shared instance of the digital file, the second shared instance of the digital file being different than the first shared instance of the digital file;
  determining a second location identifier identifying a location of the second shared instance of the digital file;
  associating the second location identifier with the second digital signature; and
  configuring, based on the second location identifier, the representation of the second electronic message to reference the second shared instance of the digital file rather than the first shared instance of the digital file.

22. A system comprising:
a processor;
a memory;
  means for receiving an electronic message addressed to a user, the electronic message including a header portion, a content portion, and a digital file;
  means for storing a representation of the electronic message with at least the header portion in association with the user's mailbox;
  means for determining a digital signature for the digital file included in the electronic message;
  means for accessing, from electronic storage, multiple digital signatures, each of the multiple digital signatures corresponding to a digital file included in a previous electronic message received by the electronic messaging system prior to receiving the electronic message;
  means for comparing the digital signature for the digital file included in the electronic message against the accessed multiple digital signatures;
  means for determining based on the comparison results whether the digital signature for the digital file included in the electronic message relates to a digital signature included in the accessed multiple digital signatures;
  means for determining that the digital signature for the digital file included in the electronic message relates to a digital signature included in the accessed multiple digital signatures;
    means for identifying the related digital signature, the related digital signature corresponding to the digital file;
    means for accessing volume data associated with the related digital signature, the volume data being based on a number of times that the digital file has been included in electronic messages received by the electronic messaging system;
    means for determining, based on the accessed volume data, whether the digital file has been included in electronic messages received by the electronic messaging system more than a threshold number of times;
    means for determining that the digital file has been included in electronic messages received by the electronic messaging system more than the threshold number of times;
      means for accessing a location identifier associated with the related digital signature, the location identifier identifying a location of the shared digital file corresponding to the related digital signature;
      means for configuring, based on the accessed location identifier, the representation of the electronic message to reference the shared digital file corresponding to the digital file;
    means for determining that the digital file has not been included in electronic messages received by the electronic messaging system more than the threshold number of times;
      means for storing a user version of the digital file in electronic storage associated with the electronic messaging system, and
      means for configuring the representation of the electronic message to access the user version of the digital file.

23. A computer-readable storage medium encoded with executable instructions that, when executed, operate to cause a computer to perform operations comprising:
  receiving an electronic message addressed to a user, the electronic message including a header portion, a content portion, and a digital file;
  storing a representation of the electronic message with at least the header portion in association with the user's mailbox;
  determining a digital signature for the digital file included in the electronic message;
  accessing, from electronic storage, multiple digital signatures, each of the multiple digital signatures corresponding to a digital file included in a previous electronic message received by the electronic messaging system prior to receiving the electronic message;
  comparing the digital signature for the digital file included in the electronic message against the accessed multiple digital signatures;
  based on comparison results, determining whether the digital signature for the digital file included in the electronic message relates to a digital signature included in the accessed multiple digital signatures; and
  conditioned on determining that the digital signature for the digital file included in the electronic message relates to a digital signature included in the accessed multiple digital signatures:
    identifying the related digital signature, the related digital signature corresponding to the digital file;
    accessing volume data associated with the related digital signature, the volume data being based on a number of times that the digital file has been included in electronic messages received by the electronic messaging system;
    determining, based on the accessed volume data, whether the digital file has been included in electronic messages received by the electronic messaging system more than a threshold number of times;
    conditioned on determining that the digital file has been included in electronic messages received by the electronic messaging system more than the threshold number of times:
      accessing a location identifier associated with the related digital signature, the location identifier identifying a location of the shared digital file corresponding to the related digital signature, and
      configuring, based on the accessed location identifier, the representation of the electronic message to reference the shared digital file corresponding to the digital file; and conditioned on determining that the digital file has not been included in electronic messages received by the electronic messaging system more than the threshold number of times:
  storing a user version of the digital file in electronic storage associated with the electronic messaging system, and
  configuring the representation of the electronic message to access the user version of the digital file.

24. A system comprising:
a processor;
a memory;
  means for receiving a first electronic message addressed to a first user, the first electronic message including an digital file;
  means for storing a representation of the first electronic message;
  means for determining a first digital signature for the digital file included in the first electronic message;
  means for accessing, from electronic storage, a second digital signature corresponding to a digital file included in a previous electronic message received by the electronic messaging system prior to receiving the first electronic message;
  means for comparing the first digital signature for the digital file included in the first electronic message against the second digital signature;
  means for determining based on comparism results that first digital signature for the digital file included in the first electronic message relates to the second digital signature, the second digital signature being associated with a first shared instance of the digital file;
  means for accessing volume data associated with the second digital signature, the volume data being based on a number of times that the digital file has been included in electronic messages received by the electronic messaging system;
  means for determining, based on the accessed volume data, that the digital file has been included in electronic messages received by the electronic messaging system more than a first threshold number of times;
  means for determining in response that the digital file has been included in electronic messages received by the electronic messaging system more than the first threshold number of times;
    means for accessing a first location identifier associated with the second digital signature, the first location identifier identifying a location of the first shared instance of the digital file, and
    means for configuring, based on the accessed first location identifier, the representation of the first electronic message to reference the first shared instance of the digital file;
  means for updating the volume data associated with the second digital signature based on receiving the first electronic message including the digital file;
  means for receiving a second electronic message addressed to a second user, the second electronic message being different from the first electronic message and including the digital file;
  means for storing a representation of the second electronic message;
  means for determining a third digital signature for the digital file included in the second electronic message;
  means for accessing, from electronic storage, the second digital signature;
  means for comparing the third digital signature for the digital file included in the second electronic message against the second digital signature;
  means for determining based on comparison results that the third digital signature for the digital file included in the second electronic message relates to the second digital signature, the second digital signature being associated with the first shared instance of the digital file;
  means for accessing the updated volume data associated with the second digital signature;
  means for determining, based on the updated volume data, that the digital file has been included in electronic messages received by the electronic messaging system more than a second threshold number of times, the second threshold number of times being greater than the first threshold number of times;
  means for determining in response that the digital file has been included in electronic messages received by the electronic messaging system more than the second threshold number of times;
    means for storing a second shared instance of the digital file, the second shared instance of the digital file being different than the first shared instance of the digital file;
    means for determining a second location identifier identifying a location of the second shared instance of the digital file;
    means for associating the second location identifier with the second digital signature; and
    means for configuring, based on the second location identifier, the representation of the second electronic message to reference the second shared instance of the digital file rather than the first shared instance of the digital file.

25. A computer-readable storage medium encoded with executable instructions that, when executed, operate to cause a computer to perform operations comprising:
  receiving a first electronic message addressed to a first user, the first electronic message including an digital file;
  storing a representation of the first electronic message;
  determining a first digital signature for the digital file included in the first electronic message;
  accessing, from electronic storage, a second digital signature corresponding to a digital file included in a previous electronic message received by the electronic messaging system prior to receiving the first electronic message;
  comparing the first digital signature for the digital file included in the first electronic message against the second digital signature;
  based on comparison results, determining that first digital signature for the digital file included in the first electronic message relates to the second digital signature, the second digital signature being associated with a first shared instance of the digital file;
  accessing volume data associated with the second digital signature, the volume data being based on a number of times that the digital file has been included in electronic messages received by the electronic messaging system;
  determining, based on the accessed volume data, that the digital file has been included in electronic messages received by the electronic messaging system more than a first threshold number of times;
  in response to determining that the digital file has been included in electronic messages received by the electronic messaging system more than the first threshold number of times:

accessing a first location identifier associated with the second digital signature, the first location identifier identifying a location of the first shared instance of the digital file, and configuring, based on the accessed first location identifier, the representation of the first electronic message to reference the first shared instance of the digital file;

updating the volume data associated with the second digital signature based on receiving the first electronic message including the digital file;

receiving a second electronic message addressed to a second user, the second electronic message being different from the first electronic message and including the digital file;

storing a representation of the second electronic message;

determining a third digital signature for the digital file included in the second electronic message;

accessing, from electronic storage, the second digital signature;

comparing the third digital signature for the digital file included in the second electronic message against the second digital signature;

based on comparison results, determining that the third digital signature for the digital file included in the second electronic message relates to the second digital signature, the second digital signature being associated with the first shared instance of the digital file;

accessing the updated volume data associated with the second digital signature;

determining, based on the updated volume data, that the digital file has been included in electronic messages received by the electronic messaging system more than a second threshold number of times, the second threshold number of times being greater than the first threshold number of times;

in response to determining that the digital file has been included in electronic messages received by the electronic messaging system more than the second threshold number of times:

storing a second shared instance of the digital file, the second shared instance of the digital file being different than the first shared instance of the digital file;

determining a second location identifier identifying a location of the second shared instance of the digital file;

associating the second location identifier with the second digital signature; and configuring, based on the second location identifier, the representation of the second electronic message to reference the second shared instance of the digital file rather than the first shared instance of the digital file.

* * * * *